United States Patent Office 3,211,719
Patented Oct. 12, 1965

1

3,211,719
19-NORCARDENOLIDES
Albert von Wartburg, Basel, Jacob Binkert, Oberwil, Basel-Land, and Emil Angliker and Jany Renz, Basel, Switzerland, assignors to Sandoz Ltd., Basel, Switzerland
No Drawing. Filed Apr. 5, 1963, Ser. No. 270,819
Claims priority, application Switzerland, Apr. 11, 1962, 4,433/62; July 18, 1962, 8,663/62; Jan. 16, 1963, 532/63, 533/63
20 Claims. (Cl. 260—210.5)

The present invention relates to a process for the production of new steroids of general formula

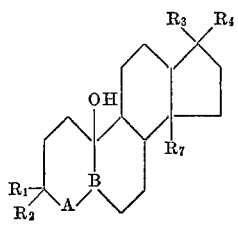

(I)

in which A—B signifies a

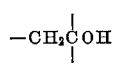

or a

group, $R_1$ signifies a hydrogen atom, $R_2$ signifies a group $OR_5$, $R_3$ signifies a hydrogen atom and $R_4$ signifies the butenolide radical or the $COCH_2OH$ group, or $R_1$ and $R_2$ and/or $R_3$ and $R_4$ together signify an oxygen atom, and $R_5$ signifies a hydrogen atom, an acyl radical containing from 1 to 4 carbon atoms or a sugar radical which may be acylated and $R_7$ signifies a hydrogen atom or a hydroxyl radical.

These new steroids of general Formula I may be produced in accordance with the invention by various syntheses directly from strophanthidin or its derivatives of general formula

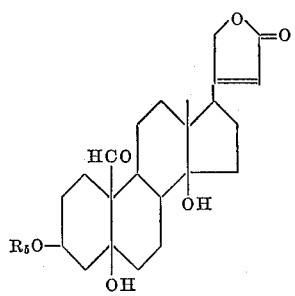

(II)

in which $R_5$ has the above significance.

In the first stage of the process in accordance with the invention strophanthidin or one of its derivatives of general Formula II is converted by oxidation to 10β-hydroxy-19-norperiplogenin (systematic nomenclature: 3β,5,10,14-

2 tetrahydroxy-19-nor-5β-carda-20(22)-enolide) or one of its derivatives of general formula

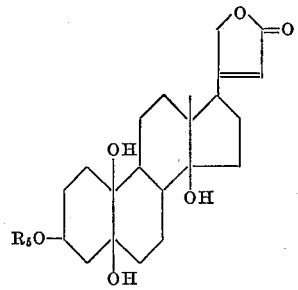

(III)

in which $R_5$ has the above significance.

10β-hydroxy-19-norperiplogenin is a representative of a completely new group of steroids, namely the 19-norcardenolides, which have now become accessible, and from which new steroids of general Formula I may be obtained.

Thus by potassium permanganate oxidation of 3-O-acyl-10β-hydroxy-19-norperiplogenin and subsequent alkylation of the resulting 19-noretianic acid, the 3β-acyloxy-5,10,14-trihydroxy-17β-alkoxycarbonyl-5β,14β-estranes of general Formula IV

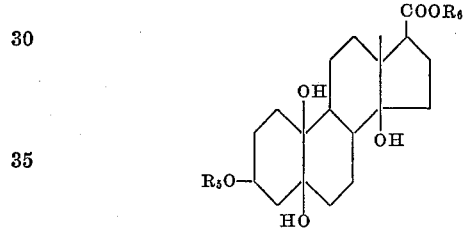

(IV)

wherein $R_5$ signifies an acyl group and $R_6$ signifies a lower alkyl group, may be produced from which, by splitting off water in the 14,15-position and subsequent hydrogenation of the resulting double bond and degradation of the alkoxycarbonyl group in position 17, new androstane derivatives, namely the 3β,5,10β-trihydroxy-19-nor-5β-androstan-17-one of general formula

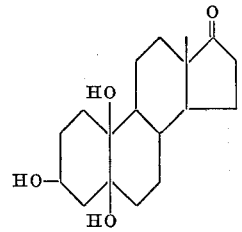

(IX)

and the 10β-hydroxy-19-nor-Δ⁴-androsten-3,17-dione of general formula

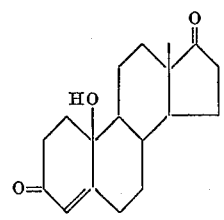

(X)

by subsequent dehydrogenation and dehydration may be produced synthetically.

As the last mentioned compound may be easily converted to estrone of general formula

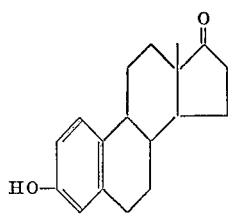

(XI)

by splitting off water, this represents a new method of synthesis for this compound.

By treating with ozone and reductive working up of the primary formed ozonides the glycol acid esters of general formula

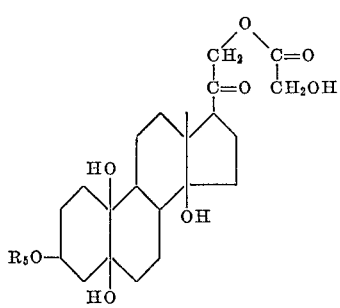

(XIII)

wherein $R_5$ signifies an acyl group, may be obtained from 3-O-acyl-10β-hydroxy-19-norperiplogenins of general Formula III, wherein $R_5$ has the above significance, and these may easily be converted to 3β-acyloxy-5,10β,14,21-tetrahydroxy-19-nor-5β,14β-pregnan - 20 - ones of general formula

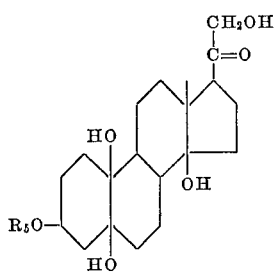

(XIV)

wherein $R_5$ has the above significance.

The 10β-hydroxy-19-norperiplogenin may also be converted to 3 - oxo - 5,10,14 - trihydroxy - 19-nor-5β-carda-20(22)-enolide of general formula

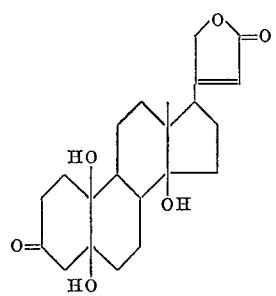

(XV)

by selective dehydrogenation whilst maintaining the butenolide radical in the 17-position. By selectively splitting off 1, 2 or 3 molecules of water from 3-oxo-5,10,14-trihydroxy - 19 - nor - 5β-carda-20(22)-enolide the 3-oxo- 10,14-dihydroxy-19-norcarda-4,20(22)-dienolide of general formula

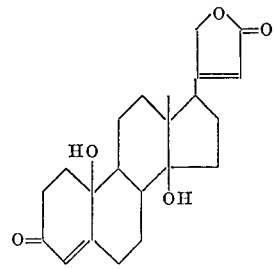

(XVI)

the 3,14 - dihydroxy-19-norcarda-1,3,5(10),20(22)-tetraenolide of general formula

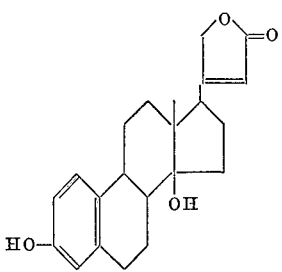

(XVII)

or the 3-hydroxy-19-norcarda-1,3,5(10),14,20(22)-pentaenolide of geenral formula

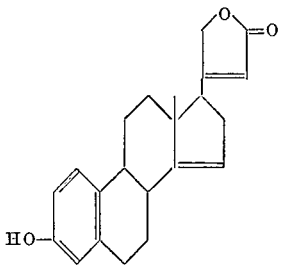

(XVIII)

may be obtained.

The two last mentioned compounds may be converted to their 3-alkoxy derivatives of general formulae (XVIIa)

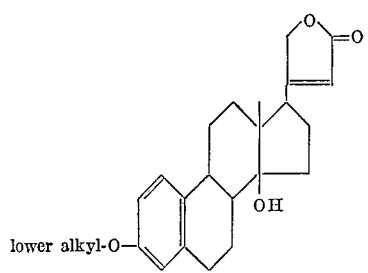

and (XVIIIa)

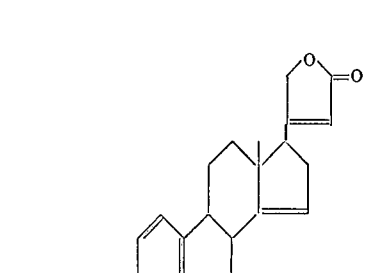

from which, by degradation of the butenolide radical, the already known etianic acid of general formulae (XIX)

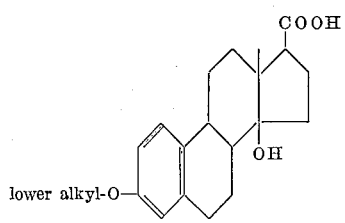

and (XX)

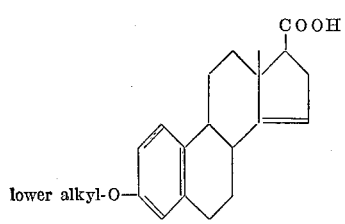

and, by esterification, their esters may be obtained respectively.

This synthesis has made it possible for the first time to obtain steroids of a variety of structural types from a heart glycoside or its aglycone, namely strophanthidin and its derivatives (k-strophanthoside, cymarin, etc.). Examples of the steroids which may be produced in this manner are 19-norandrostane, estrane and pregnane derivatives and various etianic acids.

Of the various new steroids which may be produced in accordance with the invention, 10β-hydroxy-19-norperiplogenin,
3β,5,10β-trihydroxy-19-nor-5β-androstan-17-one,
10β-hydroxy-19-nor-Δ⁴-androsten-3,17-dione,
3β-acetoxy-5,10β,14,21-tetrahydroxy-19-nor-5β,14β-pregnan-20-one,
3-oxo-5,10,14-trihydroxy-19-nor-5β-carda-20(22)-enolide,
3-oxo-10,14-dihydroxy-19-norcarda-4,20(22)-dienolide and
3-hydroxy-19-norcarda-1,3,5(10),14,20(22)-pentaenolide are of a special interest because of their variety of uses.

Thus, for example, 10β-hydroxy-19-norperiplogenin is characterized by its strophanthidin-like cardio-activity. It is furthermore an important intermediate for the production of the above mentioned steroids.

The androstane derivatives of the Formulae IX and X have a diuretic and anabolic action and the pregnane derivative of the Formula XIV has an anti-inflammatory and anti-allergic action. The compounds of the Formulae XV and XVI may be used as intermediates for the production of the pharmacodynamically interesting compound of the Formula XVIII which contains the A ring substituted with a hydroxy radical in the 3-position, characteristic of estrone as well as the butenolide ring of the cardio-active glycosides in position 17.

This compound thus has a wide pharmacodynamic spectrum of activity which makes it suitable for a combined therapeutic treatment.

The above syntheses have furthermore provided new methods for the production of known steroids, e.g. for the production of estrone and the 3-alkoxy-14-hydroxy-14β-estra-1,3,5(10)-triene and 3 - alkoxy - estra - 1,3,5(10) 14-tetraene-17β-carboxylic acids and their esters.

The various steps of the process may, for example, be effected as follows:

The oxidation of compounds of the general Formula II to form compounds of the general Formula III may be effected by autoxidation by the air or other oxygen containing gas mixtures in an organic solvent. Whilst a variety of solvents may be used, acetone, chloroform and chloroform/methanol mixtures have been found to give favourable results. The oxidation may, however, also be effected by using acetic acid, ethyl acetate, methanol or glacial acetic acid as the solvent.

The concentration of the solution of the starting materials greatly influences the yield of compounds of the general Formula III. Upon oxidation of dilute solutions the yield is very small as the main product is strophanthidin-19-carboxylic acid or one of its derivatives. Upon using saturated or oversaturated solutions, however, the compound of the general Formula III is obtained as the main oxidation product in a yield of 50-80%. The reaction time for the autoxidation lies between 20 and 300 hours.

In accordance with the invention, strophanthidin as such, its 3-O-acetate, its glycosides, e.g. k-strophanthoside, k-strophanthin-β, helveticoside or cymarin or their acetates may be used for the autoxidation. 10β-hydroxy-19-norperiplogenin or strophanthin-19-carboxylic acid may, for example, be obtained from strophanthidin and 10β-hydroxy-19-norperiplogenin-cymaroside or cymarylic acid from cymarin.

The oxidative degradation of the butenolide ring of the 3 - O - acetyl - 10β - hydroxy - 19 - norperiplogenin may be effected with potassium permanganate in acetone. The acid portions may be extracted from the resulting reaction solution in known manner and methylated in a methanol solution with an excess of ethereal diazomethane solution to yield 3β-acetoxy-5,10,14-trihydroxy-17β-methoxycarbonyl-5β,14β-estrane.

By reacting 3β-acetoxy-5,10,14-trihydroxy - 17β - methoxycarbonyl-5β,14β-estrane with HCl in an acetic acid solution, water is split off to yield 3β-acetoxy-5,10-dihydroxy-17β-methoxycarbonyl-5β-estren-(14) of the general formula

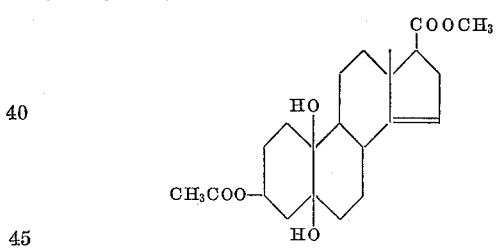

(V)

which may be hydrogenated with a platinum catalyst in glacial acetic acid to form the saturated 14-desoxyetianic acid derivative of the general formula

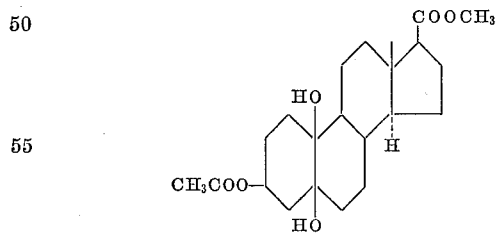

(VI)

upon taking up 1 mol of hydrogen. Condensation of the compound of the Formula VI with p-anisyl magnesium bromide in absolute tetrahydrofuran yields the corresponding dianisyl-carbinol of formula

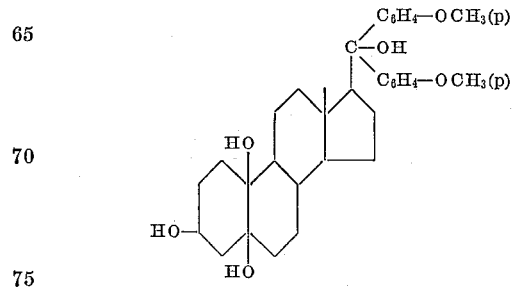

(VII)

from which water may easily be split off by boiling in acetic acid. The resulting ethylene compound of formula

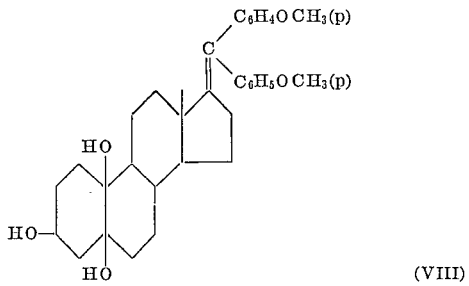

(VIII)

is treated in ethyl acetate at −80° with dry ozone, without first being purified, and the ozonide is worked up in a reducing medium, whereupon the 3β,5,10β-trihydroxy-19-nor-5β-androstan-17-one (Formula IX) results. Conversion of this trihydroxy-ketone to form 10β-hydroxy-19-nor-Δ⁴-androsten-3,17-dione (Formula X) is effected by first dehydrogenating the alcohol function at the $C_3$ atom with oxygen and splitting off water from the resulting crude 3-oxo-derivative by heating in glacial acetic acid. The resulting 10β-hydroxy-19-nor-Δ⁴-androsten-3,17-dione (Formula X) may be converted to estrone by treating with hydrochloric acid in glacial acetic acid which causes water to be split off.

The oxidation of 10β-hydroxy-19-nortestosterone of general formula

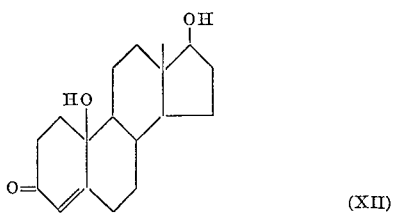

(XII)

to form 10β-hydroxy - 19 - nor-Δ⁴-androsten - 3,17 - dione (Formula X) may be effected with molecular oxygen by using platinum as catalyst.

By carefully treating 3-O-acetyl-10β-hydroxy-19-norperiplogenin with ozone and reducing the resulting product, a compound of general formula

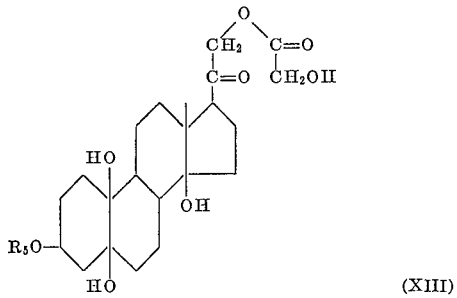

(XIII)

wherein $R_5$ signifies acetyl results and may easily be converted to 3β-acetoxy-5,10β,14,21-tetrahydroxy-19-nor-5β,14β-pregnan-20-one (Formula XIV), wherein $R_5$ signifies the acetyl radical.

Selective dehydrogenation of 10β-hydroxy-19-nor-periplogenin yields 3-oxo-5,10,14-trihydroxy-19-nor-5β-carda-20(22)-enolide (Formula XV) from which water may be split off to yield 3-oxo-10,14-dihydroxy-19-norcarda-4,20(22)-dienolide (Formula XVI). This splitting off of water may, for example, be effected by boiling for a short time in glacial acetic acid. By splitting off 1 or 2 mols of water from 3-oxo-10,14-dihydroxy-19-norcarda-4,20(22) - dienolide, 3,14-dihydroxy - 19 - norcarda-1,3,5 (10),20(22)-tetraenolide (Formula XVII) or 3-hydroxy-19-norcarda-1,3,5(10),14,20(22)-pentaenolide (Formula XVIII), respectively, result. The 1 or 2 mols of water may be split off by treating 3-oxo-10,14-dihydroxy-19-norcarda - 4,20(22) - dienolide with an inorganic acid, whereby 1 or 2 molecules are split off depending on the concentration of the acid used. Naturally the cardatetraenolide and the cardapentaenolide may be produced directly from the cardenolide by using a suitable dehydrating agent.

3,14-dihydroxy-19-norcarda - 1,3,5(10),20(22) - tetraenolide (Formula XVII) and 3-hydroxy-19-norcarda-1,3,5(10),14,20(22)-pentaenolide (Formula XVIII) may be methylated to the corresponding 3-methoxy derivatives of the Formulae XVIIa and XVIIIa respectively, by means of an ethereal diazoalkane solution, for example. The resulting 3-methoxy-14-hydroxy - 19 - norcarda - 1,3,5(10), 20(22)-tetraenolide (Formula XVIIa, lower alkyl is a methyl group) may be oxidized to form 3-methoxy-14-hydroxy-17β-carboxy-14β-estra - 1,3,5,(10) - triene (Formula XIX, lower alkyl is a methyl group) by carefully oxidizing with potassium permanganate and 3-methoxy-19-norcarda-1,3,5(10),14,20,(22) - pentaenolide (Formula XVIIIa, lower alkyl is a methyl group) may in similar manner be oxidized to 3-methoxy-17β-carboxy-estra-1,3, 5(10),14-tetraen (Formula XX, lower alkyl is a methyl group). The potassium permanganate oxidation is preferably effected in acetone at temperatures about the freezing point. The resulting 17-COOH compounds may be converted in known manner to form their respective methyl esters by, for example, reacting with an ethereal diazomethane solution.

In the following non-limitative examples, all temperatures are indicated in degrees centigrade; melting points are uncorrected.

EXAMPLE 1.—10β-HYDROXY-19-NORPERIPLOGENIN 100 ml. of purest acetone, distilled over $KMnO_4$, are poured over 10 g. of chromatographically homogeneous strophanthidin and the mixture left to stand in the dark for 3 days in a loosely closed flask which is occasionally shaken. After this time the strophanthidin has completely gone into solution and after a further 5 days the clear, slightly yellow solution is evaporated in a vacuum, the residue dissolved in 500 ml. of chloroform and the chloroform solution first washed 4 times, each time with 50 ml. of an ice cold 2 N soda solution and subsequently twice, each time with 10 ml. of water, dried over $Na_2SO_4$ and evaporated in a vacuum. The analytically pure 10β-hydroxy-19-norperiplogenin is obtained from the residue by repeated recrystallization from a mixture of one part of methanol and two parts of ether. Double melting point 130–132°/205–218°, $[\alpha]_D^{20}=+3.2°$ (c.=0.529 in methanol).

EXAMPLE 2.—3-O-ACETYL-10β-HYDROXY-19-NORPERIPLOGENIN

The 3-O-acetyl-10β-hydroxy-19-norperiplogenin is obtained from 3-O-acetyl-strophanthidin in a manner analogous to that described in Example 1. After recrystallization from methanol/ether the pure product has a melting point of 230–235° (decomposition), $[\alpha]_D^{20}=+26.2°$ (c.=0.965 in methanol), $[\alpha]_D^{20}=+42.2°$ (c.=0.665 in chloroform).

EXAMPLE 3.—10β-HYDROXY-19-NORPERIPLO-GENIN-CYMAROSID

This compound is obtained from 5 g. of cymarin in 25 ml. of acetone in a manner analogous to that described in Example 1. After recrystallization from methanol, the pure product has a double melting point of 129–131°/ 203–206°, $[\alpha]_D^{20}=+33.7°$ (c.=1.060 in methanol), $[\alpha]_D^{20}=+29.6°$ (c.=0.810 in chloroform).

EXAMPLE 4.—10β-HYDROXY-19-NORPERIPLO-GENIN-CYMAROSID ACETATE

This compound was obtained from cymarin acetate in a manner analogous to that described in Example 1. After recrystallization from methanol/ether the pure product has a melting point of 209° (decomposition)

$[\alpha]_D^{20} = +42.5°$
(c.=0.66 in chloroform), $[\alpha]_D^{20} = +43.0°$ (c.=0.65 in methanol).

EXAMPLE 5.—3β-ACETOXY-5,10,14-TRIHYDROXY-17β-METHOXY-CABONYL-5β-14β-ESTRANE 3 g. of finely powdered KMnO₄ are added to 3 g. of 3-O-acetyl-10β-hydroxy-19-norperiplogenin dissolved in 150 ml. of acetone whilst stirring vigorously at +3°. After two hours a further 1.8 g. of permanganate and after a further two hours 0.6 g. of KMnO₄ are added. After a reaction time of 6 hours, the mixture is evaporated in a vacuum at 20°, dilute sulphuric acid added to the residue and the mixture exhaustively shaken with chloroform. The combined chloroform phases are concentrated. So as to remove the acids, the oxidation products are taken up in cholorform/ether (1:2) and shaken 6 times, each time with 60 ml. of an ice cold 2 N soda solution. The soda extracts are immediately acidified with 2 N H₂SO₄ and exhaustively extracted with chloroform. The extract is evaporated to dryness, the residue dissolved in methanol and methylated with an excess ethereal diazomethane solution. After evaporation of the solvent, the crude ester is chromatographed on aluminium oxide. The fractions eluted with benzene/chloroform (1:1) yield crystals from ether. 3β-acetoxy-5,10,14-trihydroxy-17β-methoxycarbonyl-5β,14β-estrane has a melting point of 158–162° or 177–184° $[\alpha]_D^{20} = +61.4°$ (c.=0.488 in chloroform).

EXAMPLE 6.—3β-ACETOXY-5,10-DIHYDROXY-17β-METHOXYCARBONYL-5β-ESTREN(14)

Dry HCl gas is passed through a solution of 1.0 g. of 3β - acetoxy - 5,10,14 - trihydroxy - 17β - methoxycarbonyl-5β,14β-estrane in 100 ml. of purest glacial acetic acid for one hour at +10°. The intense yellow coloured solution is evaporated at a bath temperature of 25° and the amorphous residue chromatographed on aluminium oxide devoid of alkali. The Δ¹⁴-ester crystallizes from ether from the fractions eluted with benzene/chloroform (4:1 and 1:1). Melting point 168–171°, $[\alpha]_D^{20} = +57.6°$ (c.=0.513 in chloroform).

EXAMPLE 7.—3β-ACETOXY-5,10-DIHYDROXY-17β-METHOXYCARBONYL-5β-ESTRANE 500 mg. of 3β-acetoxy-5,10-dihydroxy-17β-methoxycarbonyl-5β-estren-(14) are dissolved in 50 ml. of glacial acetic acid and shaken with prehydrogenated catalyst of 140 mg. of PtO₂.H₂O over hydrogen. After approximately 40 minutes 1.04 mols of H₂ have been taken up. The solution, filtered off from the platinum, is evaporated. After recrystallization of the residue from ether/pentane the 3β-acetoxy-5,10-dihydroxy-17β-methoxycarbonyl-5β-estrane crystallizes in the form of rectangular plates having a double melting point of 128–130°/150–152°; $[\alpha]_D^{20} = +78.7°$ (c.=0.483 in chloroform). Chromatography of the mother liquors yields a further quantity of pure desoxyester.

EXAMPLE 8.—DIANISYL-CARBINOL OF FORMULA VII 7.2 g. of freshly distilled p-bromoanisole and 1.08 g. of magnesium shavings in 24 ml. of absolute tetrahydrofuran are converted to the Grignard compound. 500 mg. of dried 3β-acetoxy-5,10-dihydroxy-17β-methoxycarbonyl-5β-estrane in 24 ml. of absolute tetrahydrofuran are added quickly dropwise to the clear, dark-coloured solution and the mixture is then heated at reflux for 5–6 hours in the absence of moisture. 60 ml. of ether, 7 g. of finely ground ice and 24 ml. of 2 N H₂SO₄ are added to the cooled reaction solution which is still clear. After separation of the ether, the aqueous layer is shaken a further 3 times, each time with 50 ml. of fresh ether. All the ether phases are combined, washed until neutral with a little water and dried over Na₂SO₄. After the evaporation of the solvent, a yellow oil remains from which crystalline carbinol VII separates upon dilution with a little benzene. It is recrystallized from acetone and has a melting point of 280–281°; $[\alpha]_D^{20} = -58.2°$ (c.=0.550 in chloroform). The mother liquor remaining after separation of the crystalline carbinol VII is chromatographed on aluminium oxide. The fractions eluted with benzene crystallize from a little ether to yield colourless leaflets having a melting point of 130–132° (identified as 1,1-bi-(4-methoxyphenyl)-ethylene). The later fractions of the chromatograph, eluted with benzene/chloroform mixtures, pure chloroform and chloroform/methanol, contain mainly, in addition to a small quantity of compound VII, its 3-O-acetyl derivative. This compound is dissolved in 9 ml. of methanol and upon the addition of 0.6 g. of KOH in 0.6 ml. of water left to stand overnight. After dilution with 9 ml. of water the mixture is evaporated in a vacuum at 23° to approximately 8 ml. The aqueous concentrate is shaken exhaustively with chloroform/ether (1:2). The organic phases are combined, washed until neutral and evaporated. After chromatography and crystallization of the first fractions from ether, the resulting yellow oil yields additional carbinol VII, which is homogeneous according to the thin layer chromatograph.

EXAMPLE 9.—DIANISYL-ETHYLENE DERIVATIVE VIII 800 mg. of crystalline dianisyl-carbinol VII are taken up in 17 ml. of glacial acetic acid and boiled at reflux for 75 minutes. Evaporation yields the crude dianisyl-ethylene derivative VIII, which is used for the splitting with ozone without further purification.

EXAMPLE 10.—3β,5,10β-TRIHYDROXY-19-NOR-5β-ANDROSTAN-17-ONE 800 mg. of crude dianisyl-ethylene compound VIII are dissolved in 125 ml. of dry ethyl acetate. Dry ozone is passed through the solution which has been cooled to −80° for 15 minutes. The deep blue reaction solution is kept at −80° for a further 20 minutes and dry nitrogen is then passed therethrough. The ethyl acetate solution, which has turned colourless, is evaporated in a vacuum at 20°, the syrupy residue is taken up in 20 ml. of glacial acetic acid and small portions of zinc dust are added whilst shaking until KI starch paper no longer turns blue. The mixture is then filtered, repeatedly washed with chloroform and the filtrate evaporated. The residue is dissolved in chloroform and washed a number of times in a little water. Upon evaporation, the chloroform phase yields a yellow residue, which may be separated by chromatography on aluminium oxide. A benzene/chloroform (1:1) and a chloroform eluate, containing mainly 4,4′-dimethoxy-benzophenone, is discarded and the chloroform/methanol (99:1) eluate is crystallized from acetone/ether: 3β,5,10β-trihydroxy-19-nor-5β-androstan-17-one results in colourless prisms which combined form rosettes. Melting point 208–212°, $[\alpha]_D^{20} = +79.3°$ (c.=0.473 in chloroform).

EAXMPLE 11.—10β-HYDROXY-19-NOR-Δ⁴-ANDROSTENE-3,17-DIONE (a) From 10β-hydroxy-19-nortestosterone 100 mg. of 10β-hydroxy-19-nortestosterone are dissolved in 18 ml. of acetone and 10 ml. of water and shaken with platinum catalyst (produced by hydrogenation of 50 mg. of PtO₂.H₂O in 6 ml. of water) for 22 hours over pure oxygen. The catalyst is filtered off and the filtrate evaporated. The residue is separated into its components by chromatography on aluminium oxide and the starting material again subjected to dehydrogenation. After repeating this process a number of times, the fractions of the 17-keto derivative are combined, chromatographed again and the first compound recrystallized from ether. 10β-hydroxy-19-nor - Δ⁴ - androstene - 3,17 - dione yields colourless leaflets having a melting point of 198–211°, $[\alpha]_D^{20} = +143.0°$ (c.=0.490 in chloroform).

(b) *From 3β,5,10β-trihydroxy-19-nor-5-androstan-17*

70 mg. of this compound, dissolved in 14 ml. of acetone and 5 ml. of water, are shaken with a platinum catalyst (produced by hydrogenation of 50 mg. of $PtO_2 \cdot H_2O$ in 3 ml. of water) for 21 hours with pure oxygen. After filtering off the catalyst and evaporation of the solvent, the crystalline residue is taken up in 5 ml. of glacial acetic acid and boiled for a quarter of an hour whilst passing dry $N_2$ therethrough. After the evaporation of the solvent, the residue is purified by chromatography on aluminium oxide. The first fractions yield crystalline, homogeneous 10β-hydroxy-19-nor-Δ⁴-androstene-3,17-dione from acetone/ether or from pure ether. Melting point 197–207°, $[\alpha]_D^{20} = +141°$ (c.=0.455 in chloroform). All the data of this compound correspond to those of the above described compound.

EXAMPLE 12.—ESTRONE

Dry HCl gas is passed through a solution of 50 mg. of 10β-hydroxy-19-nor-Δ⁴-androstene-3,17-dione in 6 ml. of glacial acetic acid at +7° during the course of 2 hours. The mixture is then evaporated in a vacuum at 20°, the residue dissolved in 20 ml. of ether and washed until neutral with a saturated $KHCO_3$ solution and water. Upon evaporation yellow crystals crystallize from the ether phases. After chromatography on aluminium oxide and crystallization of the first fractions from acetone, estrone, which according to the thin layer chromatograph is homogeneous, results. Melting point 254–259°.

EXAMPLE 13.—3β-ACETOXY-5,10β,14,21-TETRA-HYDROXY-19-NOR-5β,14β-PREGNAN-20-ONE

A dry ozone/oxygen mixture is passed through a solution of 1 g. of 3-O-acetyl-10β-hydroxy-19-norperiplogenin in 150 ml. of ethyl acetate at −80° during the course of 10 minutes. The deep blue coloured solution is kept at −80° for a further 20 minutes and then evaporated in a vacuum at a maximum bath temperature of 25° whilst nitrogen is passed therethrough. The resulting syrupy residue is taken up in 20 ml. of glacial acetic acid and small portions of zinc dust are added whilst shaking, until such time as a drop of the solution no longer turns KI starch paper blue. Subsequently the mixture is filtered and the filtrate evaporated in a vacuum. The residue, the major portion of which consists of amorphous glycol acid ester of Formula XIII is taken up in 100 ml. of methanol, a solution of 2 g. of $KHCO_3$ in 25 ml. of water added thereto and the mixture left to stand at 20–25° for 65 hours. The mixture is then concentrated in a vacuum to approximately 25 ml. made acid with a 0.5 N sulphuric acid and the aqueous concentrate shaken exhaustively with chloroform/isopropanol (9:1). The combined chloroform/isopropanol extracts are washed with water until neutral, dried over sodium sulphate and evaporated. For the purpose of purification the residue is chromatographed on aluminium oxide. Pure 3β-acetoxy-5,10β,14,21-tetra-hydroxy-19-nor-5β,14β-pregnan-20-one crystallizes from the fractions eluted with chloroform and with chloroform/methanol mixtures. Melting point 170–174°; $[\alpha]_D^{20} = +66.4°$ (in chloroform). The ketol reduces an ammoniacal silver diamine solution quickly and strongly.

EXAMPLE 14.—3-OXO-5,10,14-TRIHYDROXY-19-NOR-5β-CARDA-20(22)-ENOLIDE 3 g. of 10β-hydroxy-19-norperiplogenin produced in accordance with Example 1 dissolved in 600 ml. of acetone/water (1:1), are shaken with prehydrogenated platinum catalyst (from 600 mg. of $PtO_2 \cdot H_2O$ suspended in 90 ml. of water) for 20 hours in an atmosphere of oxygen. The catalyst is filtered off and rewashed with acetone. The residue resulting after evaporation of the filtrate is recrystallized a number of times from methanol/ether; colourless needles having a melting point of 256–261°; $[\alpha]_D^{20} = +39.4°$ (c.=0.457 in methanol).

EXAMPLE 15.—3-OXO-10,14-DIHYDROXY-19-NORCARDA-4,20(22)-DIENOLIDE 1.2 g. of 3-oxo-5,10,14-trihydroxy-19-nor-5β-carda-20(22)-enolide are dissolved in 20 ml. of glacial acetic acid and boiled at reflux for 15 minutes in an atmosphere of nitrogen. After evaporation of the solvent, the residue is chromatographed on aluminium oxide. The fractions eluted with chloroform/benzene (3:1 and 9:1) are combined, the solvent evaporated in a vacuum and the residue recrystallized from ethanol; colourless prisms having a melting point of 220–240°; $[\alpha]_D^{20} = +62.4°$ (c.=0.512 in methanol) and $[\alpha]_D^{20} = +62.8°$ (c.=0.501 in chloroform/methanol 95:5).

EXAMPLE 16.—3,14-DIHYDROXY-19-NORCARDA-1,3,5(10),20(22)-TETRAENOLIDE 500 mg. of finely powdered 3-oxo-10,14-dihydroxy-19-norcarda-4,20(22)-dienolide are added to 100 ml. of glacial acetic acid containing 0.5 g. of HCl at room temperature whilst stirring. After approximately 5 minutes, the compound completely goes into solution. The mixture is stirred for a further two hours, the solvent evaporated in a vacuum at 20° and the yellow residue chromatographed on aluminium oxide. After eluation with chloroform/methanol (98:2) and recrystallization from acetone, crystals having a double melting point of 248–251°/272° result; $[\alpha]_D^{20} = +86.7°$ (c.=0.658 in chloroform/methanol 9:1).

EXAMPLE 17.—3-METHOXY-14-HYDROXY-19-NORCARDA-1,3,5(10),20(22)-TETRAENOLIDE 50 mg. of 3,14-dihydroxy-19-norcarda-1,3,5(10),20(22)-tetraenolide are dissolved in 4.5 ml. of dioxane and 0.5 ml. of methanol and left to stand with an excess of ethereal diasomethane solution for two days at room temperature. After evaporation of the solvent, the residue is chromatographed on aluminium oxide. The first fractions crystallize from methanol to yield colourless needles having a melting point of 149–150° or having a double melting point of 146–148°/184–188°; $[\alpha]_D^{20} = +80.8°$ (c.=0.581 in chloroform).

EXAMPLE 18.—3-HYDROXY-19-NORCARDA-1,3,5(10),14,20(22)-PENTAENOLIDE

Dry HCl gas is passed through a solution of 500 mg. of 3-oxo-10,14-dihydroxy-19-norcarda-4,20(22)-dienolide in 37.5 ml. of glacial acetic acid at +10° at such a rate that the bubbles form slowly. This causes the solution to turn yellow and fluoresce green. After two hours the solvent is evaporated at 20° in a vacuum and the residue chromatographed on aluminium oxide. After elution with chloroform/methanol (99:2) and recrystallization from acetone, prismatic needles having a melting point of 284–293° (sintering at 270°) result; $[\alpha]_D^{20} = +79.6°$ (c.=0.482 in chloroform/methanol 9:1).

EXAMPLE 19.—3-METHOXY-19-NORCARDA-1,3,5(10),14,20(22)-PENTAENOLIDE 300 mg. of 3-hydroxy-19-norcarda-1,3,5(10),14,20(22)-pentaenolide are dissolved in 36 ml. of dioxane and 4 ml. of methanol and an ethereal diasomethane solution added by distillation. After standing for two days the solvent is evaporated off. The residue crystallizes from acetone/ether in flat leaflets which combine to form rosettes. Melting point 180–188°; $[\alpha]_D^{20} = +57.9°$ (c.=0.553 in chloroform).

EXAMPLE 20.—3-METHOXY-14-HYDROXY-17β-METHOXYCARBONYL-14β-ESTRA-1,3,5(10)-TRIENE 400 mg. of 3-methoxy-14-hydroxy-19-norcarda-1,3,5(10),20(22)-tetraenolide are dissolved in 30 ml. of acetone and 400 mg. of powdered KMnO₄ and after two hours a further 250 mg. of permanganate are added at 4° whilst stirring. After a further 4 hours the acetone is evaporated off in a vacuum and the residue intimately mixed with 10 ml. of water containing 3.5 ml. of 2 N sulphuric acid. The resulting suspension is extracted five times with chloroform and the combined chloroform extracts concentrated in a vacuum. A 2 N soda solution is added to the residue, the insoluble portions are filtered off from the soda solution, the solution made acid to Congo red indicator, extracted a number of times with chloroform and the combined extracts evaporated in a vacuum. The residue is dissolved in methanol, esterified with an ethereal diazomethane solution and the crude methylation product chromatographed on aluminium oxide. The fractions eluted with chloroform/benzene mixtures yield colourless prisms having a melting point of 140–152° upon recrystallization from ether/pentane; $[\alpha]_D^{20} = +89.7°$ (c.=0.544 in chloroform). After redissolving a number of times in ether/pentane, flat prisms, having a melting point of 150–154°, result. The mixed melting point with authentic 3-methoxy-14-hydroxy-17β - methoxy-carbonyl - 14β-estra-1,3,5(10)-triene, having a melting point of 152–154°, shows no depression.

EXAMPLE 21.—3 - METHOXY-17β-METHOXYCARBONYL-ESTRA-1,3,5(10),14-TETRAENE 271 mg. of 3-methoxy-19-norcarda-1,3,5(10),14,20(22)-pentaenolide are dissolved in 12 ml. of acetone and 270 mg. of finely powdered KMnO₄ added thereto at +4° whilst stirring vigorously. After two hours a further 160 mg. and after another two hours 65 mg. of permanganate are added. The further working up, esterification and chromatographical purification is effected in the manner described in Example 20. After recrystallization from ether/pentane, the fractions eluted with benzene/chloroform (1:1) yield 2.4 mg. of hexagonal leaflets having a melting point of 166–168°. Upon admixture of the compound with authentic 3-methoxy-17β-methoxycarbonyl-estra-1,3,5(10),14-tetraene, having a melting point of 167–168.5°, no depression of the melting point was observed.

What is claimed is:

1. A method for the preparation of estrone which comprises oxidizing 3-O-acetyl-strophanthidin in two stages, first with gaseous oxygen and then subjecting the so obtained 3-O-acetyl-10β-hydroxy - 19 - norperiplogenin to oxidation with potassium permanganate, esterifying the formed 3β - acetoxy - 5,10,14 - trihydroxy - 17β - carboxy-5β,14β-estrone with diazomethane, splitting off water from the so obtained 3 -acetoxy-5,10,14-trihydroxy-17β-methoxy-carbonyl-5β,14β-estrone to obtain 3β-acetoxy-5,10-dihydroxy-17β-methoxy - carbonyl-5β-estren-(14), hydrogenating the latter to 3β-acetoxy-5,10-dihydroxy-17β-methoxy-carbonyl-5β-estrane, subjecting the latter to a Grignard reaction with p-bromoanisole, hydrolyzing the Grignard complex to obtain the tertiary carbinol, dehydrating the latter to the ethylene compound and subjecting said ethylene compound to ozone to obtain 3β,5,10β-trihydroxy-19-nor-5β-androstan-17-one, subjecting the latter to dehydrogenation in the 3 position and thereafter splitting off two mols of water from the dehydrogenated product.

2. A method for selective oxidation of 19-oxo-cardenolide to the corresponding 10β-hydroxy-19-norsteroids comprising oxidizing the 19-oxo-cardenolide with a gas selected from the group consisting of oxygen and air.

3. A method for the preparation of a compound having the formula

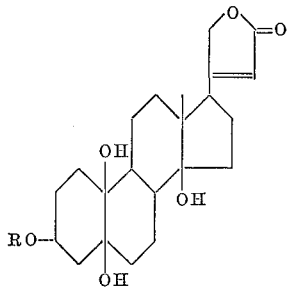

wherein R is a member of the group consisting of hydrogen, acetate and glycoside comprising subjecting a compound of the formula

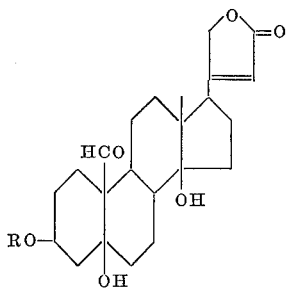

wherein R has the above significance, to oxidation with air.

4. A method as claimed in claim 3, wherein said oxidation is performed in an inert organic solvent.

5. A method for the preparation of 3β-acetoxy-5,10β,14,21 - tetrahydroxy - 19 - nor-5β,14β-pregnan-20-one comprising subjecting a 3-O-acyl-strophanthidin to oxidation with gaseous oxygen, subjecting the so obtained 3-O-acyl-10β-hydroxy-19-norperiplogenin to a treatment with ozone to form an ozonide, working up the so obtained ozonide and saponifying the reduced ozonide which is obtained in the form of a glycolic ester.

6. A method for the preparation of 3,14-dihydroxy-19-norcarda-1,3,5(10),20(22)-tetraenolid comprising selectively dehydrogenating 10β-hydroxy-19-norperiplogenin to form 3-oxo-5,10,14-trihydroxy-19-nor-5β-carda-20(22)-enolid and thereafter splitting off 2 mols of water from the latter.

7. 10β-hydroxy-19-norperiplogenin.

8. 3-O-acetyl-10β-hydroxy-19-norperiplogenin.

9. 10β-hydroxy-19-norperiplogenin-cymaroside.

10. 10β - hydroxy - 19 - norperiplogenin - cymaroside acetate.

11. 3β - acetoxy - 5,10,14-trihydroxy-17β-methoxycarbonyl-5β,14β-estrane.

12. 3β - acetoxy-5,10-dihydroxy-17β-methoxycarbonyl-5β-estren-(14).

13. 3β - acetoxy-5,10-dihydroxy-17β-methoxycarbonyl-5β-estrane.

14. 3β,5,10β-trihydroxy-19-nor-5β-androstan-17-one.

15. 3β - acetoxy - 5,10β,14,21 - tetrahydroxy - 19-nor-5β,14β-pregnan-20-one.

16. 3 - oxo-5,10,14-trihydroxy-19-nor-5β-carda-20(22)-enolide.

17. 3 - oxo - 10,14 - dihydroxy-19-norcarda-4,20(22)-dienolide.

18. 3 - hydroxy - 19 - norcarda - 1,3,5(10),14,20(22)-pentaenolide.

19. 3 - methoxy - 14 - hydroxy - 19 - norcarda - 1,3,5(10),20(22)-tetraenolide.

20. 3 - methoxy - 19 - norcarda-1,3,5(10),14,20(22)-pentaenolide.

References Cited by the Examiner

UNITED STATES PATENTS 2,729,654   1/56   Colton _____ 260—397.4

LEWIS GOTTS, *Primary Examiner.*